United States Patent
Eilers et al.

(10) Patent No.: US 11,447,894 B2
(45) Date of Patent: Sep. 20, 2022

(54) APPARATUS WITH PARTICLE- OR FIBER-MAKING DEVICE AND AN ENDLESS BELT

(71) Applicant: Reifenhaeuser GmbH & Co. KG Maschinenfabrik, Troisdorf (DE)

(72) Inventors: Peter Eilers, Troisdorf (DE); Sven Sanden, Leverkusen (DE); Tobias Inderfurth, Koenigswinter (DE)

(73) Assignee: REIFENHAEUSER GMBH & CO. KG MASCHINENFABRIK, Troisdorf (DE)

(*) Notice: Subject to any disclaimer, the term of this patent is extended or adjusted under 35 U.S.C. 154(b) by 549 days.

(21) Appl. No.: 16/016,742

(22) Filed: Jun. 25, 2018

(65) Prior Publication Data

US 2018/0371646 A1 Dec. 27, 2018

(30) Foreign Application Priority Data

Jun. 27, 2017 (EP) .................... 17178094

(51) Int. Cl.
| | | |
|---|---|---|
| *D01D 10/04* | (2006.01) | |
| *D01D 5/098* | (2006.01) | |
| *D04H 3/16* | (2006.01) | |
| *B29B 13/06* | (2006.01) | |
| *D04H 3/02* | (2006.01) | |
| *D04H 1/70* | (2012.01) | |
| *D01D 4/02* | (2006.01) | |

(52) U.S. Cl.
CPC ......... *D01D 10/0472* (2013.01); *B29B 13/06* (2013.01); *D01D 4/025* (2013.01); *D01D 5/0985* (2013.01); *D04H 1/70* (2013.01); *D04H 3/02* (2013.01); *D04H 3/16* (2013.01)

(58) Field of Classification Search
CPC .. D01D 10/0472; D01D 4/025; D01D 5/0985; D04H 3/02; D04H 1/70; D04H 3/16; D04H 5/08
See application file for complete search history.

(56) References Cited

U.S. PATENT DOCUMENTS

| | | | | |
|---|---|---|---|---|
| 3,007,205 | A * | 11/1961 | House ................. | B29C 44/1266 264/171.24 |
| 3,302,987 | A * | 2/1967 | Hoffmann ............ | F16C 33/605 384/569 |
| 3,434,220 | A * | 3/1969 | Forster ................ | C08C 3/00 34/264 |
| 3,449,888 | A * | 6/1969 | Gausman .............. | B29C 65/30 53/552 |
| 3,657,759 | A * | 4/1972 | Sawyer ................ | A47L 11/4069 15/98 |
| 3,889,983 | A * | 6/1975 | Freize ................. | F16L 27/0828 285/13 |

(Continued)

*Primary Examiner* — Jacob T Minskey
*Assistant Examiner* — Caroline Beha
(74) *Attorney, Agent, or Firm* — Andrew Wilford

(57) ABSTRACT

An apparatus has a particle and/or fiber-making device and a foraminous endless belt extending in a longitudinal travel direction. A pair of horizontally spaced end rollers between which the belt is stretched horizontally receive fibers or particles from the device. A rotatable support roller between the end rollers directly engages and supports the belt, extends a full width of the belt, and has a diameter of less than 200 mm.

18 Claims, 3 Drawing Sheets

(56) References Cited

U.S. PATENT DOCUMENTS

| | | | | |
|---|---|---|---|---|
| 4,219,524 | A * | 8/1980 | Miller | B29C 70/508 264/216 |
| 5,017,110 | A * | 5/1991 | Wanek | B29B 9/00 425/302.1 |
| 5,058,485 | A * | 10/1991 | Cardillo | F04B 1/2042 91/485 |
| 5,169,571 | A * | 12/1992 | Buckley | B29C 35/0888 264/128 |
| 6,074,504 | A * | 6/2000 | Yu | B29C 66/343 156/137 |
| 2002/0029842 | A1* | 3/2002 | Nishida | B30B 5/062 156/171 |
| 2002/0098762 | A1* | 7/2002 | Shelley | D01D 5/0985 442/336 |
| 2003/0071391 | A1* | 4/2003 | Brady | B29C 55/023 264/210.2 |
| 2003/0131740 | A1* | 7/2003 | Butsch | F26B 13/105 101/32 |
| 2006/0244220 | A1* | 11/2006 | Lundberg | F16J 15/3472 277/345 |
| 2009/0127375 | A1* | 5/2009 | Heimrich | B65H 26/00 242/559 |
| 2010/0151156 | A1* | 6/2010 | Kawabe | B29C 48/834 428/1.31 |
| 2012/0100362 | A1* | 4/2012 | Ellis | C08J 5/24 428/298.1 |
| 2014/0103556 | A1* | 4/2014 | Diaz de Leon Izquierdo | D01D 5/088 264/14 |

* cited by examiner

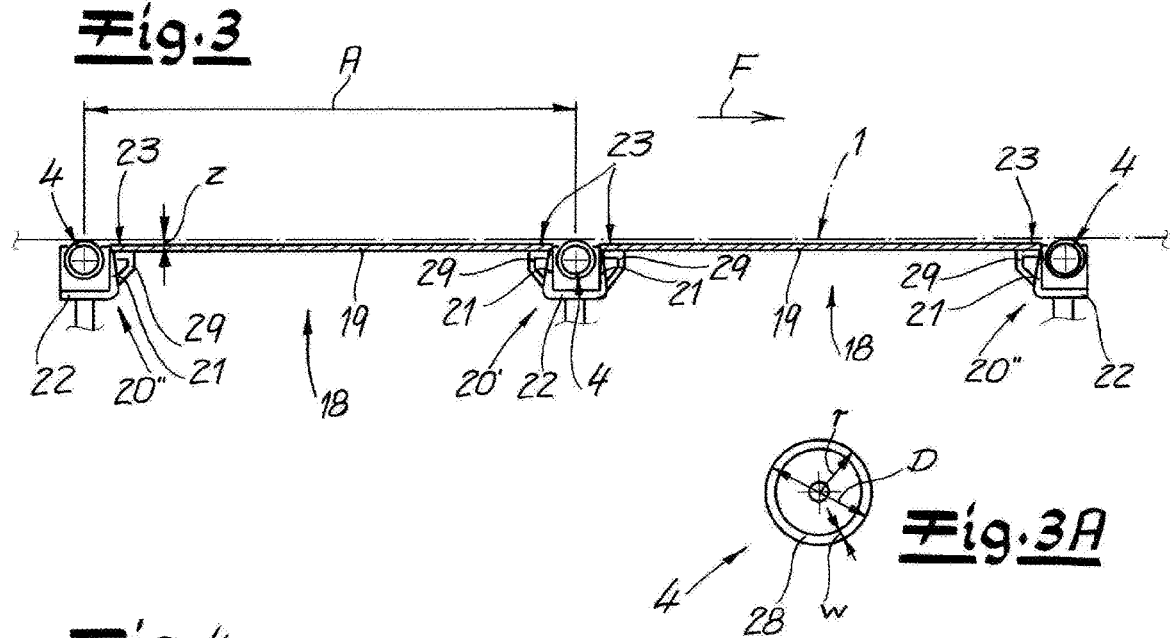
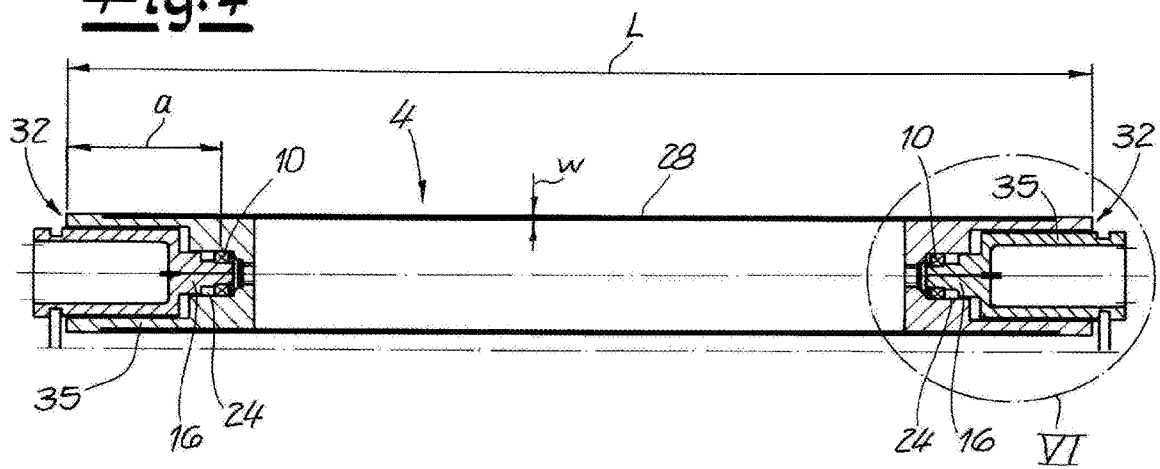
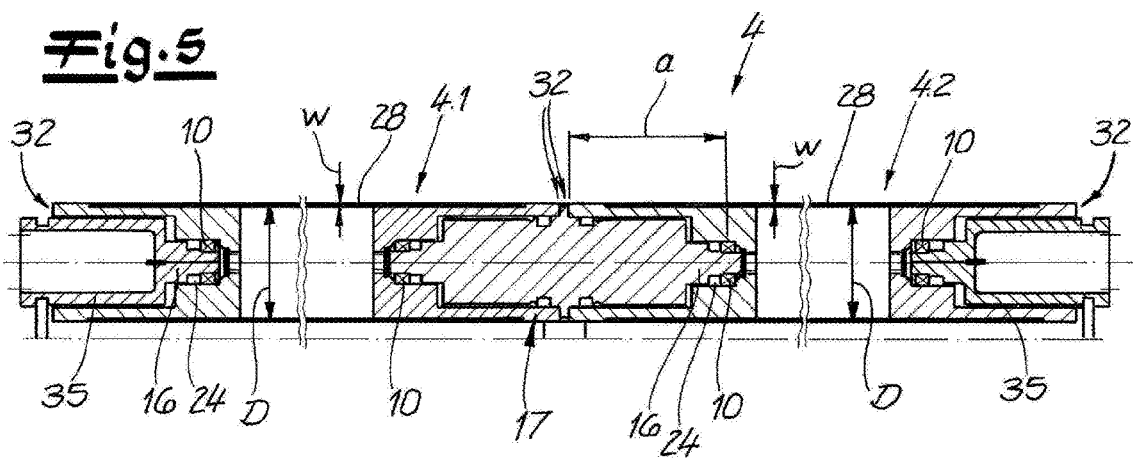

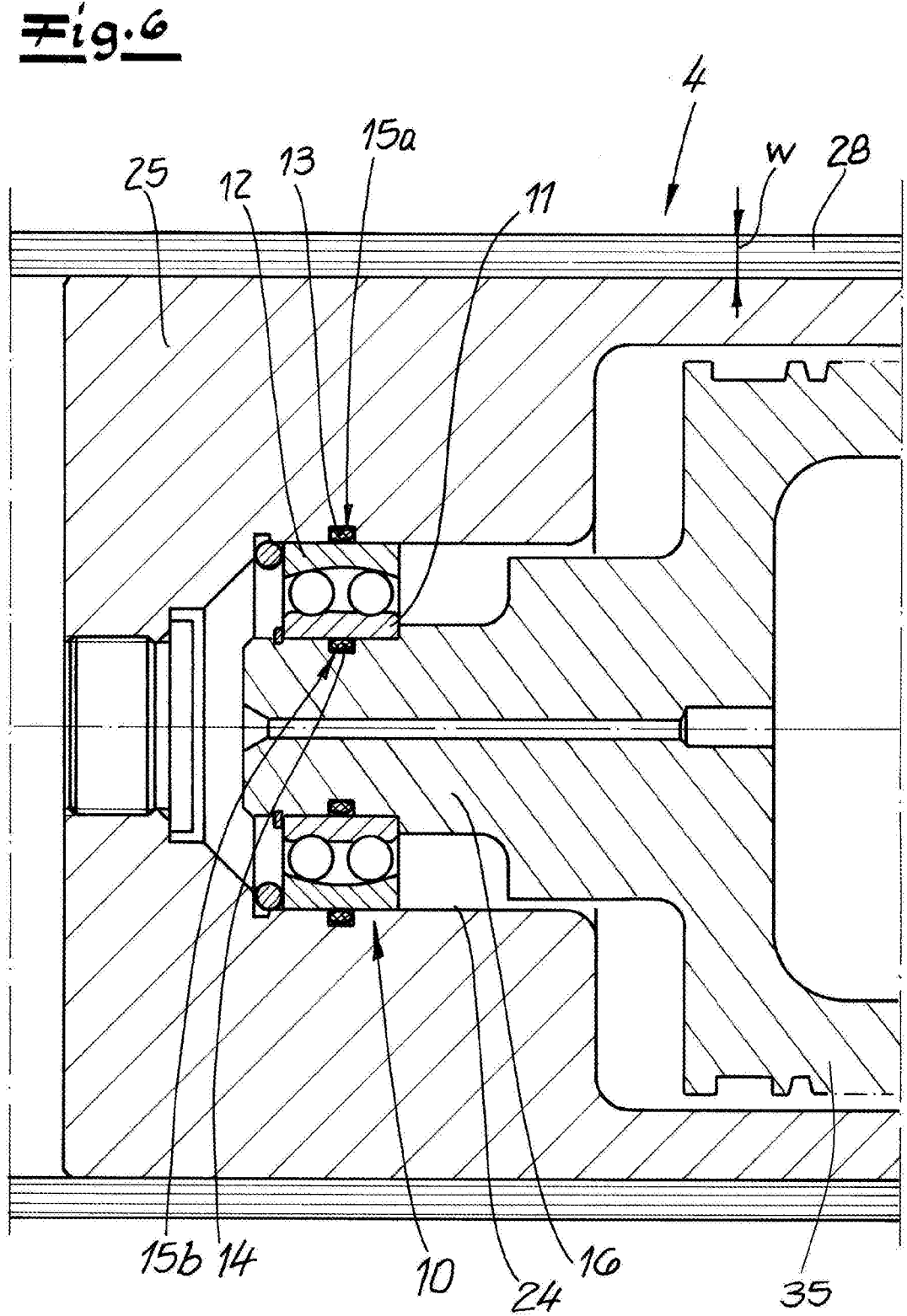

APPARATUS WITH PARTICLE- OR FIBER-MAKING DEVICE AND AN ENDLESS BELT

FIELD OF THE INVENTION

The present invention relates to an apparatus with at least one particle- or fiber-making device and an endless belt. More particularly this invention concerns such an apparatus for making a spun-bond or melt-blown web.

BACKGROUND OF THE INVENTION

An apparatus with a particle-or fiber making device typically has at least one treatment device for treating the particles and/or fibers, particularly for temperature-controlling and/or stretching and/or distributing the particles and/or fibers, and at least one endless belt, particularly a mesh belt, on which depositing the particles and/or fibers are deposited. The apparatus is particularly a spun-bond apparatus and/or a melt-blown apparatus for producing continuous filaments.

Various versions of apparatuses of the above-described type are known from practice. In many of these known apparatuses, particularly including spun-bond apparatuses and melt-blown apparatuses, the endless mesh belt for receiving the particles and/or filaments is a fabric tape made of plastic, and this endless mesh belt is frictionally supported over long distances over its entire lower face by plates. Thus, the endless mesh belt has direct contact with the plates. The plates are steel sheets or plastic plates, for example. Areas of the mesh belt with relatively high wear are often also supported on their lower face by quick-change steel profiles. An undesirably high level of wear occurs both on the endless mesh belt and on the supporting plates and profiles. In addition, unpleasant running noise is produced and, due to the friction, a relatively large amount of drive energy is required in order to move the endless mesh belt. One especially disadvantageous aspect of the apparatuses known from practice is that particles resulting from the wear get into the product being conveyed by the endless mesh belt, particularly into a nonwoven web made of filaments. As a result, the conveyed products are contaminated and can be rendered unusable, potentially resulting in a relatively large amount of waste. The wearing of the endless mesh belt increases in a quasi exponential manner over its service life, mainly on account of previously damaged friction points and increasing abrasion. As a result, a relatively early replacement of the endless mesh belt becomes necessary. This is associated with significant operating costs. The supporting structures that are impacted by the wear must also be replaced relatively often. This results in unwanted machine downtime and also relatively high costs for replacement parts. As a result, the known measures have room for improvement.

OBJECTS OF THE INVENTION

It is therefore an object of the present invention to provide an improved apparatus with a particle- or fiber-making device and an endless belt.

Another object is the provision of such an improved apparatus with a particle- or fiber-making device and an endless belt that overcomes the above-given disadvantages, in particular that avoids the above-described drawbacks in a simple and effective manner.

SUMMARY OF THE INVENTION

An apparatus has according to the invention a particle and/or fiber-making device and a foraminous endless belt extending in a longitudinal travel direction. A pair of horizontally spaced end rollers between which the belt is stretched horizontally receive fibers or particles from the device. A rotatable support roller between the end rollers directly engages and supports the belt, extends a full width of the belt, and has a diameter of less than 200 mm, preferably less than 190 mm, more preferably less than 180 mm, and especially preferably less than or equal to 170 mm.

In principle, it is also possible in the context of the invention for only one support roller to be used between two end rollers in order to support the endless belt or endless mesh belt. According to an especially recommended embodiment, however, at least two support rollers according to the invention are provided between two end rollers. In the context of the invention, "endless belt" and "endless mesh belt" also refer to a belt assembled from a plurality of belt sections or in which a plurality of belt sections that are fixed to one another produce the endless foraminous belt.

An especially preferred embodiment of the invention is characterized in that the apparatus is a fiber-making device and that the fibers produced are deposited on the endless belt or endless mesh belt. According to a very recommended embodiment of the invention, the apparatus according to the invention or the fiber-making device is a spun-bond apparatus. According to this embodiment, the apparatus has at least one spinneret for spinning continuous filaments, as well as at least one treatment device in the form of a cooler for cooling the continuous filaments, and at least one stretcher for stretching the continuous filaments. It lies within the scope of the invention for the stretched continuous filaments to be deposited as a nonwoven deposit on the endless belt or endless mesh belt.

At least one monomer extractor is advantageously provided between the spinneret and the cooler.

According to a recommended embodiment, the cooler is equipped with at least two cooling chambers that are provided one above the other and/or in succession in the direction of filament travel in which cooling air of different temperatures can be applied to the continuous filaments. It is recommended that the stretcher have an intermediate passage extending from the cooler and a draw-down passage extending the intermediate passage. One preferred embodiment is characterized in that at least one diffuser is provided between the stretcher and the endless belt or endless mesh belt through which the continuous filaments pass before being deposited on the endless belt.

One especially recommended embodiment is characterized in that the subassembly of the cooler and the stretcher is a closed unit in which, other than the cooling air that is supplied in the cooler, no additional air is supplied. The invention is based on the discovery that the measures according to the invention have proven to be very especially useful in such a spun-bond apparatus. In this context, the invention is also based on the discovery that, in many of the spun-bond apparatuses known from practice, the nonwoven deposit and/or the resulting spun-bond nonwovens are affected in an especially disadvantageous manner by the abrasion of the endless belt on the one hand and of the structures supporting the endless belt on the other hand. In this regard, the teaching according to the invention provides a remedy in a relatively simple, effective, and functionally reliable manner, particularly in the case of spun-bond apparatuses or with regard to the spun-bonded nonwovens that are produced.

According to another very recommended embodiment of the invention, the apparatus according to the invention is a fiber-making device in the form of a melt-blown device. The nonwoven deposit deposited on the endless belt is then a melt-blown nonwoven deposit or a melt-blown nonwoven fabric. In this embodiment, the apparatus according to the invention has at least one melt-blown nozzle for producing continuous filaments, and these continuous filaments can be deposited as melt-blown nonwovens on the endless belt or endless mesh belt. Here, too, the invention is based on the discovery that melt-blown nonwovens are negatively affected in many of the known melt-blown devices by the abrasion on the endless belt on the one hand and by the abrasion of the supporting structural elements on the other hand. And here again, the invention provides a remedy in melt-blown nonwovens in a surprisingly simple and efficient manner.

One especially reliable embodiment of the invention is characterized in that the production speed of the apparatus and hence the speed of the endless belt or endless mesh belt is 100 to 1500 m/min, particularly 200 to 1300 m/min, preferably greater than 900 m/min, and more preferably greater than 1000 m/min. It lies within the scope of the invention for the apparatus to be set up such that the speed of the support rollers is greater than 1500 rpm, particularly greater than 1800 rpm, preferably greater than 1900 rpm, and very preferably greater than 2000 rpm. According to an advantageous embodiment of the invention, the speed of the support rollers is in the range between 1000 and 2800 rpm.

Preferably, the support rollers are pipes or cylindrical tubes. In this preferred embodiment, the walls of the tubular support rollers have a wall thickness w of from 3 to 30 mm and preferably of from 3 to 10 mm. It is advantageous for the wall of the support rollers to be made of plastic, particularly of a fiber-reinforced plastic. A carbon fiber-reinforced plastic is very especially preferred as the material for the wall of the support rollers.

The invention is based on the discovery that it is advantageous to support and guide the endless belt or endless mesh belt by ultralight and freely rotating support rollers. The resulting rolling friction reduces wear on the endless belt to a minimum, and no slippage occurs between the endless belt and roller surface. The use of ultralight-running support rollers increases the service life of the apparatus components and equipment availability.

One especially recommended embodiment of the invention is characterized in that at least two or at least three support rollers are provided between two end rollers of the endless belt, each of which extends over the entire width of the endless belt. According to one proven embodiment, only two or only three support rollers are provided between two end rollers of the endless belt.

According to a first preferred embodiment of the invention, at least one support roller and/or preferably each and every one of the support rollers extends as a single endless support roller over the entire width of the endless belt or endless mesh belt. If is advantageous if such a support roller has no separation point or no separating gap over its longitudinal extension transverse to the direction of conveyance of the endless belt. According to a second preferred embodiment of the invention, at least one support roller is composed or, preferably, all support rollers are (each) formed by partial support rollers. A plurality of, preferably two, partial support rollers are arranged in succession in the longitudinal direction of a support roller (transverse to the direction of conveyance of the endless belt), thereby complementing one another to form the complete support roller extending over the width of the endless belt. Two partial support rollers are advantageously interconnected by a bearing arrangement. Preferably, a support roller extending over the width of the endless belt is formed by two partial support rollers arranged in succession, with these two partial support rollers being preferably interconnected by a bearing arrangement.

It lies within the scope of the invention for at least two bearings or rolling-element bearings to be associated with a support roller according to the invention that are provided at the ends of the support roller. It also lies within the scope of the invention for at least two bearings or rolling-element bearings to be associated with each partial support roller that are present at the ends of the partial support rollers. The bearings are advantageously self-aligning ball bearings. One recommended embodiment of the invention is characterized in that the bearings or rolling-element bearings provided at both ends or at both end faces of a support roller are arranged or received with inner race and outer race in the respective support roller. It lies within the scope of the invention for a journal pin to engage in a bearing recess of the support roller in the vicinity of a bearing or roller bearing and for the roller bearing to be provided between the journal pin that is provided in the bearing recess and the support roller or an inner wall of the support roller. Advantageously, this arrangement is designed both for a single support roller that extends over the width of the endless belt and for a partial support roller as part of a support roller.

In a partial support roller, the roller bearing provided at both ends of the partial support roller is advantageously also disposed or received with its inner race and outer race in the respective partial support roller. It lies within the scope of the invention if, in a partial support roller, at least one journal pin engages in a bearing recess of the partial support roller and if the bearing with inner race and outer race is provided between the respective journal pin and an inner wall of the partial support roller. It also lies within the scope of the invention if, in a support roller formed by a plurality of partial support rollers, a journal pin engages in a bearing recess of an edge-side partial support roller at the edges of the endless belt. A journal pin of a bearing arrangement that is provided for the purpose of connecting the partial support rollers engages in a bearing recess of the respective partial support roller on the opposite side of the respective partial support roller. A roller bearing is preferably interposed with inner race and outer race between the journal pin and the inner walls of the support roller.

According to an especially recommended embodiment of the invention, at least one sealing ring or O-ring is arranged in relation to the bearing of the support rollers according to the invention between a bearing on the one hand and the associated support roller and/or an associated journal pin on the other hand. Preferably, at least one first sealing ring or O-ring for securing or fixing an outer race of the bearing of a support roller is provided between the outer race and the support roller. It is advantageous if the at least one first sealing ring or O-ring is provided in a groove of the inner wall of the support roller. Furthermore, at least one second sealing ring or O-ring for securing or fixing an inner race of a support roller is preferably provided between the inner race and a journal pin for the support roller. In that case, the second sealing ring or O-ring is preferably accommodated in a second groove, which second groove is advantageously introduced into the journal pin.

According to a very recommended embodiment of the invention, at least one sealing ring or O-ring is associated with both the outer race of the bearing and the inner race of the bearing and preferably rests directly against the outer race and directly against the inner race. In principle, the outer race and/or the inner race of the bearing can also be secured by a plurality of juxtaposed sealing rings or O-rings.

The sealing rings or O-rings that are preferably provided ensure effective securing of the outer race and/or inner race against rotation in the bearing recess or on the journal pin. The preferred embodiment and arrangement of the bearing advantageously enables the support rollers to be set in motion with relative ease. By virtue of the arrangement of the sealing rings, these also form an effective insertion aid for the bearing, so special insertion chamfers for the insertion of a bearing are not required. Due to their damping effect, the sealing rings also provide for a reduction of disturbing vibrations and noises and thus also bring about advantageous noise reduction. In particular, a sealing ring provided on the outer race of the bearing provides an effective seal against undesired passage of lubricant.

One especially preferred embodiment of the invention is characterized in that a roller bearing of a support roller is offset by a spacing a to the end face of the support roller, with the spacing a being at least 1/30, preferably at least 1/25 of the length L of the support roller. Advantageously, this also applies to the embodiment with the partial support rollers that are assembled to form an entire support roller, in which case L then refers to the length of the entire support roller. In the embodiments described above, the spacing a is preferably measured from the center of the bearing as seen in relation to the longitudinal extension of the support roller.

According to a recommended embodiment of the invention, the support rollers according to the invention have a diameter/length ratio of greater than 1:17.5, preferably greater than 1:22.5 and preferably greater than 1:29.5. An especially recommended embodiment of the invention is characterized in that two support rollers are spaced apart by a mutual a spacing A of greater than 1000 mm, preferably greater than 1700 mm, more preferably greater than 2000 mm, and especially preferably greater than 2500 mm in the horizontal travel direction of the endless belt or endless mesh belt.

According to a preferred embodiment of the invention, the space between two successive support rollers is filled at least partially, preferably for the most part, and most preferably completely or virtually completely by a plate that extends in the travel direction of the endless belt or endless mesh belt. It lies within the scope of the invention for the upper face of such a plate to be offset by a spacing z below the uppermost surface of the support rollers. The spacing z is advantageously less than the radius r of the support rollers and, preferably, this spacing z is less than half the radius r of the support rollers. The plates are advantageously closed plates that are preferably accessible. Such plates can be advantageously cleaned in a simple and effective manner.

A very recommended embodiment of the invention is characterized in that a support roller is accommodated in a housing having at least one side wall and a floor-forming lower wall extending from an edge of the side wall. According to one design variant, a housing preferably has two opposing side walls and a lower wall bridging the side walls. A support roller advantageously projects upwardly from the associated housing. It lies within the scope of the invention for the housing to extend over at least the majority of the length L, and preferably over the entire length L, of the associated support roller. The housing for a support roller is advantageously a torsion-resistant and/or self-supporting and/or heavy-duty housing, preferably a housing made of sheet steel. The housing forms, as it were, a receiving chamber for the associated support roller.

According to a recommended embodiment of the invention, a plate rests with at least one end on a housing for a support roller and advantageously on a side wall of this housing. Through this abutment on the housing or on a side wall of a housing, the plates are oriented and supported in a defined manner. The plates are advantageously provided parallel or substantially parallel to the endless belt or endless mesh belt provided above it. It lies within the scope of the invention to effectively protect the plates, particularly a nonwoven deposit that is applied to the endless belt, against disturbing air currents, thus preventing unwanted turbulence on the non-compacted nonwoven deposit.

The invention is based on the discovery that substantial advantages over the previously mentioned devices are achieved by the inventive arrangement of support rollers between the upstream and downstream end rollers, particularly in terms of production quality, conservation of materials, and reduced component wear.

In this regard, the invention is also based on the discovery that the drawbacks associated with the known devices can be avoided if, according to the invention, the endless belt is only exposed to rolling friction, thereby avoiding disadvantageous frictional engagement (as occurs in the previous devices). The wear on the endless belt can thus be minimized and, to that extent, abrasion of this endless belt can be reduced to a minimum as well. In addition, there is virtually no longer any wear on contact surfaces of the structures supporting the endless belt. Virtually no wear or abrasion takes place on the support rollers responsible for the rolling friction, and the supporting plates that are preferably provided and offset by a spacing from the endless belt do not suffer any wear or abrasion.

In the context of the invention, it is of particular importance that, through the minimization of wear and abrasion, disturbing abrasion particles no longer get into the product being conveyed by the endless belt, thus enabling the product quality to be improved substantially compared to many known apparatuses. This remarkable advantage has been observed above all in the production of spun-bonded nonwovens and melt-blown nonwovens with the apparatus according to the invention. It should also be emphasized that objectionable noises can be reduced substantially by the construction according to the invention in comparison to the apparatuses known hitherto.

The support rollers according to the invention have a noise-reducing effect, and this is especially true of the preferred embodiment with the sealing rings or O-rings on the rolling-element bearings. It should also be noted that slippage between the endless belt and the support rollers can be prevented without difficulty, and than no such problems are observed in the apparatus according to the invention. Furthermore, it should be pointed out that the support rollers according to the invention advantageously have a low net mass and a low net imbalance and a low self-deformation. By virtue of the preferred mounting of the bearings or rolling-element bearings in the support rollers, the critical bending length of the support rollers can be advantageously optimized. Finally, it should be emphasized that the apparatus according to the invention can be realized in a simple manner and, above all, without complicated or complex structural components.

BRIEF DESCRIPTION OF THE DRAWING

The above and other objects, features, and advantages will become more readily apparent from the following description, reference being made to the accompanying drawing in which:

FIG. 3 is an enlarged view of a portion of the apparatus according to FIG. 1;

FIG. 3A is a large-scale view of a detail from FIG. 3;

FIG. 4 is a section through a first embodiment of the support roller according to the invention;

FIG. 5 is a second embodiment of the support roller according to the invention; and FIG. 6 is an enlarged view of the structure indicated at VI from FIG. 4.

SPECIFIC DESCRIPTION OF THE INVENTION

Figure 1:
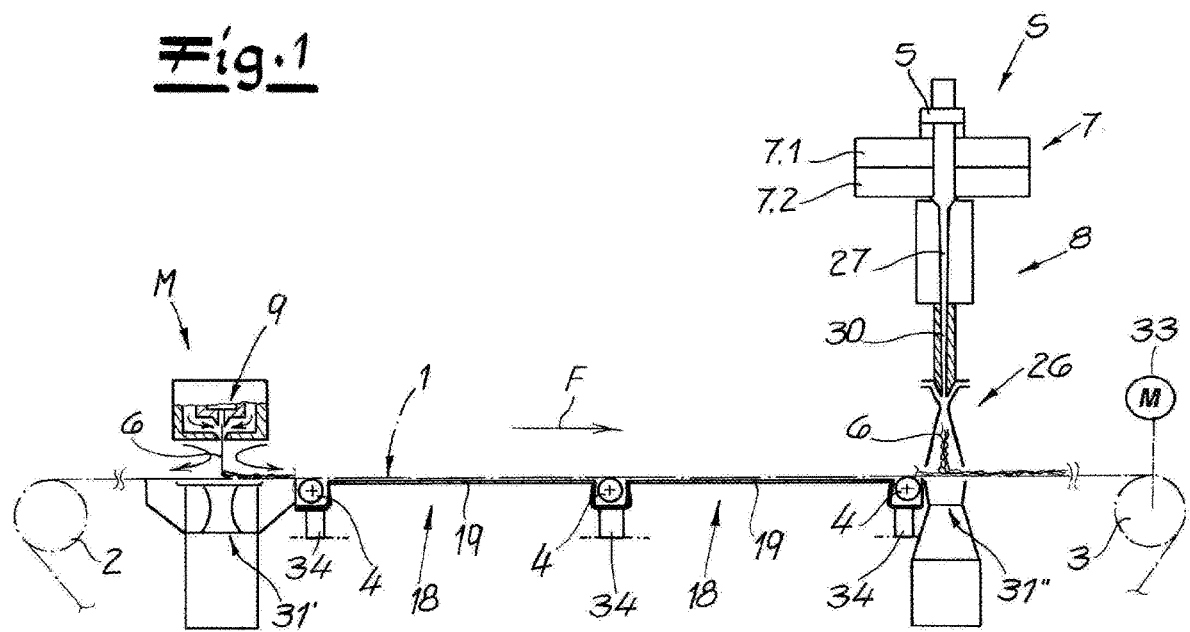
FIG. 1 is a small-scale sectional side view of an apparatus according to the invention.

As seen in the drawing, an apparatus according to the invention has two fiber-making devices in the form of a melt-blown device M and a downstream spun-bond apparatus S. With these two preferred fiber-making devices, continuous filaments 6 are produced that are deposited on an endless foraminous belt 1 made of mesh and serving as a fiber deposit or nonwoven deposit. In the embodiment according to FIG. 1, continuous filaments 6 are initially deposited with the melt-blown device M to form a melt-blown nonwoven that is transported with the endless mesh belt 1 in a travel direction F from left to right to the spun-bond apparatus S. Here, a spun-bonded nonwoven is deposited on top of the melt-blown nonwoven.

The melt-blown device M shown on the left side of FIG. 1 has a nozzle 9 for producing the continuous filaments 6. The spun-bond apparatus S shown on the right side of FIG. 1 is equipped with a spinneret 5 for spinning the continuous filaments 6. Furthermore, as a treatment device, this spun-bond apparatus S has a cooler 7 for cooling the continuous filaments 6 and a stretcher 8 for stretching them.

Advantageously and here, the cooler 7 has two cooling chambers 7.1 and 7.2 in which cooling air of different temperatures can be applied to the continuous filaments 1. Preferably and here, the stretcher 8 is equipped with a downwardly tapering intermediate passage 27 extending downward from the cooler 7 and a draw-down passage 30 extending downward from the intermediate passage 27. It is recommended that the intermediate passage 27 converge downward toward the endless mesh belt 1. Preferably and here, a diffuser 26 with a downwardly flaring passage is provided downstream of the stretcher 8 through which the continuous filaments 6 are guided before being deposited on the endless mesh belt 1. According to a recommended embodiment and here, the subassembly of the cooler 7 and the stretcher 8 is designed as a closed unit, with no additional air being supplied other than the cooling air that is supplied in the cooler 7.

Figure 2:
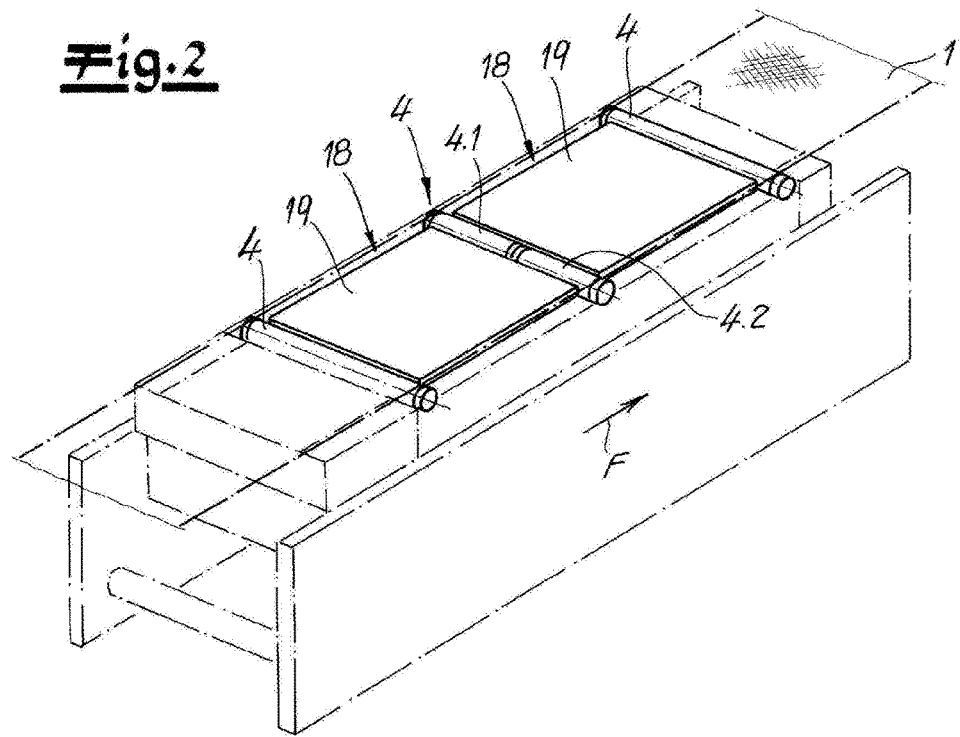
FIG. 2 is a perspective view of the apparatus according to the invention.

Here, the endless mesh belt 1 is stretched horizontally between two end rollers 2 and 3 on a plurality of support rollers 4. Three such support rollers 4 are provided here. As can be seen particularly from FIG. 2, these support rollers 4 extend transversely over the entire width of the endless mesh belt 1. According to the invention and as shown in FIG. 3A, the support rollers 4 have a diameter D of less than 200 mm. The endless mesh belt 1 is advanced in the direction F at a speed of advantageously 100 to 1500 m/min by rotation of one of the rollers 2 and 3 by a drive motor 33.

According to a very preferred embodiment, the support rollers 4 are cylindrical tubes and the wall 28 of these tubular support rollers 4 is advantageously composed substantially or entirely of plastic, preferably a fiber-reinforced plastic. Carbon fiber-reinforced plastic is preferably used here for the walls 28. A thickness w of the walls 28 is preferably 3 to 30 mm and more preferably 3 to 10 mm.

FIGS. 4 and 5 show two preferred embodiments of a support roller 4 according to the invention. Here according to FIG. 4, the support roller 4 extends as a single endless support roller 4 over the entire width of the endless mesh belt 1. In contrast, in the embodiment according to FIG. 5, the support roller 4 is formed by two partial support rollers 4.1 and 4.2. The two partial support rollers 4.1 and 4.2 of the support roller 4 are interconnected by a bearing arrangement 17. Preferably and here, the support rollers 4 and the partial support rollers 4.1 and 4.2 are supported at their ends by self-aligning ball bearings 10. According to an especially recommended embodiment and here, the roller bearings 10 of the support rollers 4 are provided and/or received with their inner race 11 and outer race 12 in the support roller 4. A journal pin 16 of a fixed support 35 preferably engages in a bearing recess 24 of an end fitting 25 of the support roller 4. Each roller bearing 10 of a support roller 4 is offset by a spacing a from a respective end 32 of the support roller 4. In the endless support roller according to FIG. 4, this spacing a is at least 1/30, preferably at least 1/25 of a length L of the support roller 4.

FIG. 6, in particular, shows an especially preferred embodiment of the invention in terms of the arrangement and design of the rolling-element bearing 10. Here, a first O-ring 13 for securing or fixing the outer race 12 of the rolling-element bearing 10 is provided between the outer race 12 and the support roller 4. This first O-ring 13 is advantageously in a radially inwardly open groove 15a of an inner wall of the end fitting 25 of the support roller 4. Recommendably and here, at least one second O-ring 14 for securing or fixing the inner race 11 of the support roller 10 is also provided between the inner race 11 and the stationary journal pin 16 for the support roller 4. Preferably and here, this second O-ring 14 is provided in a radially outwardly open groove 15b of the journal pin 16 of the support 35. The two O-rings 13 and 14 very effectively and precisely fix the position of the outer race 12 and the inner race 11 of the bearing 10, and rotation of the outer race 12 and of the inner race 11 in the bearing seat and/or on the journal pin 16 is reliably prevented. Apart from that, the O-rings 13 and 14 enable problem-free insertion of the rolling-element bearing 10 without the need for special insertion aids such as chamfers and the like. The O-rings 13 and 14 are advantageously composed or substantially formed by an elastomer and, according to one embodiment, the elastomer is acrylonitrile butadiene rubber (NBR) and/or a fluororubber (FKM).

It lies within the scope of the invention for two support rollers 4 to be separated by a spacing A of greater than 2000 mm in the travel direction F of the endless mesh belt 1.

According to an especially recommended embodiment and here, an intermediate space 18 between two successive support rollers 4 is filled by a planar and horizontal plate 19 that extends in the travel direction F of the endless mesh belt 1. It also lies within the scope of the invention for the upper face of such a plate 19 to be offset by a spacing z below the uppermost part of the support rollers 4. This spacing z is recommendably less than one-third of the radius r of the support rollers 4. Advantageously and here, the plates 19 are closed planar plates and recommendably walkable plates 19. These plates 19 are preferably composed entirely or substantially of a metal.

According to a recommended embodiment and here, each support roller 4 is held in a respective center or end housing 20' or 20" carried on respective fixed supports 34 and each having at least one vertical side wall 21 and a horizontal lower wall 22 extending as a floor from an edge of the side wall 21. It is advantageous for the center housing 20' to have two opposite side walls 21 bridged by the lower wall 22 bridging the side walls 21. Preferably and here, each housing 20' and 20" extends over the length L of the associated support roller 4, and the housings 20' and 20" open upward and/or toward the endless mesh belt 1. According to one variant and here (see FIGS. 1 and 3 in particular), the center housing 20' has two opposing side walls 21 and a lower-side lower wall 22 bridging these side walls 21. In contrast, the two end housings 20' that are provided to the left and right of this center housing 20 are provided only with a single side wall 21 extending upward from an outer edge of the respective lower wall 22.

The upstream end housing 20' is immediately downstream of an upstream suction device 31' and the downstream end housing 21" is immediately upstream of the downstream suction device 31', with the vertical side walls 21 of the housings 20' each on the side turned away from the respective suction device 31 or 31'. Preferably, the housings 20' and 20" are made of sheet steel, and it is recommended that they be torsion-resistant, self-supporting, and heavy-duty sheet steel. Advantageously and here, the plates 19 rest with their transversely extending upstream and downstream ends 23 on the housings 20' and 21" and/or on side walls 21 of the housings 20' and 20". Preferably and here, a support element 29 for the end 23 of a plate 19 is connected to the side wall 21 of each of the housings 20' and 20". It lies within the scope of the invention for the plates 19 to be parallel or substantially parallel to the endless mesh belt 1.

We claim:

1. An apparatus comprising:
   a spinneret or melt-blown nozzle emitting continuous filaments;
   a foraminous endless belt;
   a pair of horizontally spaced end rollers between which the belt is stretched horizontally in a longitudinal travel direction so as to receive the filaments from the nozzle;
   two rotatable and cylindrically tubular support rollers between the end rollers, supporting the belt, each having a wall thickness between 3 mm and 30 mm, each extending a full width of the belt, spaced horizontally apart by at least 1700 mm, each having opposite outer ends, and each having a diameter of less than 200 mm;
   respective fixed journal pins each engaging into a respective one of the ends of the support rollers; and
   respective roller bearings between each of the journal pins and the respective end of the respective support roller and the respective journal pin and each having an outer race and an inner race;
   a respective outer seal ring at each end between the respective support roller and the respective outer race; and
   a respective inner seal ring at each end between the respective pin and the respective inner race.

2. The apparatus defined in claim 1, further comprising: a treatment device for treating the filaments by cooling and depositing same on the belt.

3. The apparatus defined in claim 2, further comprising: a stretcher for the filaments.

4. The apparatus defined in claim 1, further comprising:
   a cooler for cooling the continuous filaments, and
   a stretcher for stretching the continuous filaments and depositing the stretched continuous filaments as a nonwoven on the belt.

5. The apparatus defined in claim 1, further comprising: drive means for advancing the belt in the horizontal travel direction at a speed of 100 to 1500 m/min.

6. The apparatus defined in claim 1, wherein there are three of the support rollers spaced horizontally along the belt between the end rollers.

7. The apparatus defined in claim 1, wherein the support rollers are at least substantially made of plastic.

8. The apparatus defined in claim 1, wherein at least one of the inner and outer races, the journal pins, or the ends is formed with a radially open circumferential groove receiving the respective seal ring.

9. The apparatus defined in claim 1, wherein each of the support rollers is formed by two rollers having inner ends interconnected by a bearing.

10. The apparatus defined in claim 1, wherein the roller bearings supporting each end of each of the support rollers on the respective journal pin are spaced by a distance equal to at least ½₅ of a transverse axial length of the respective support roller from an end face of the respective end of the roller.

11. The apparatus defined in claim 1, wherein each of the support rollers has a diameter/length ratio equal greater than 1:17.5.

12. The apparatus defined in claim 1, wherein each of the pins and each of the outer races has a respective cylindrical outer surface, each of the ends and each of the inner races has a respective cylindrical inner surface, and the seal is between one of the inner surfaces and the respective outer surface.

13. The apparatus defined in claim 12, wherein the cylindrical surfaces are all coaxial.

14. The apparatus defined in claim 12, wherein the inner surface of each end and the outer surface of each journal pin are formed with respective radially oppositely open grooves holding the respective inner and outer seal rings.

15. The apparatus defined in claim 1, wherein uppermost parts of outer surfaces of the support and end rollers define a horizontal plane on which an upper stretch of the belt lies and that is parallel to the direction.

16. The apparatus defined in claim 15, further comprising: respective flat plates extending horizontally between the support rollers and each of the end rollers at a spacing below the plane defined by uppermost parts of outer surfaces of the support and end rollers.

17. The apparatus defined in claim 16, further comprising: a stationary housing in which the support rollers are received, extending generally a full length of the support rollers and comprising a bottom wall below the support rollers and at least one side wall to at least one longitudinal side of the support roller and extending upward from a transversely extending edge thereof, the plate resting on the housing.

18. The apparatus defined in claim 1, wherein the seal rings are O-rings.

* * * * *